Aug. 16, 1938.   W. C. SOWLE   2,127,313
FIFTH WHEEL MOUNTING FOR VEHICLES
Filed July 14, 1937   2 Sheets-Sheet 1
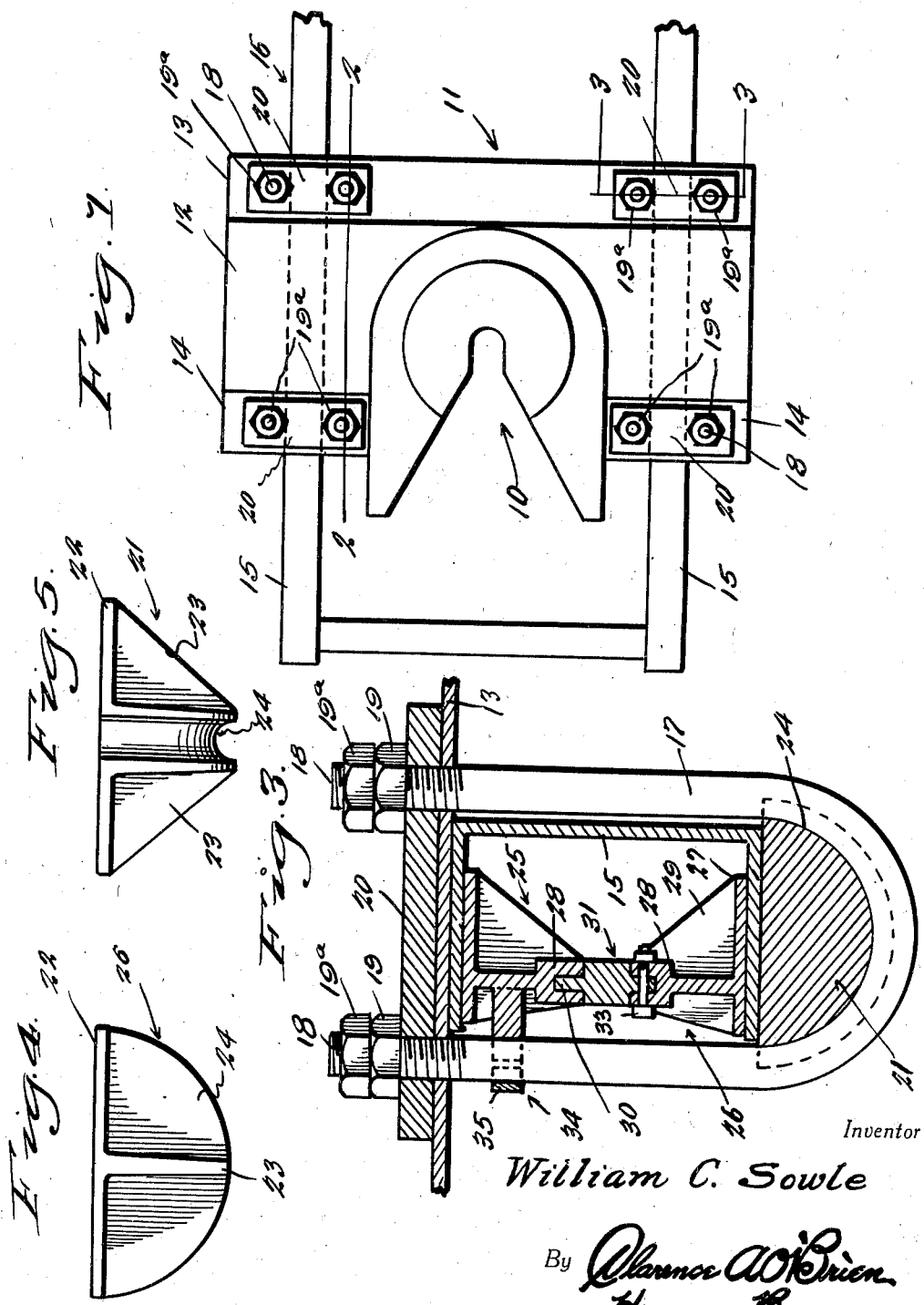
Inventor
William C. Sowle
By Clarence A. O'Brien
Hyman Berman
Attorneys

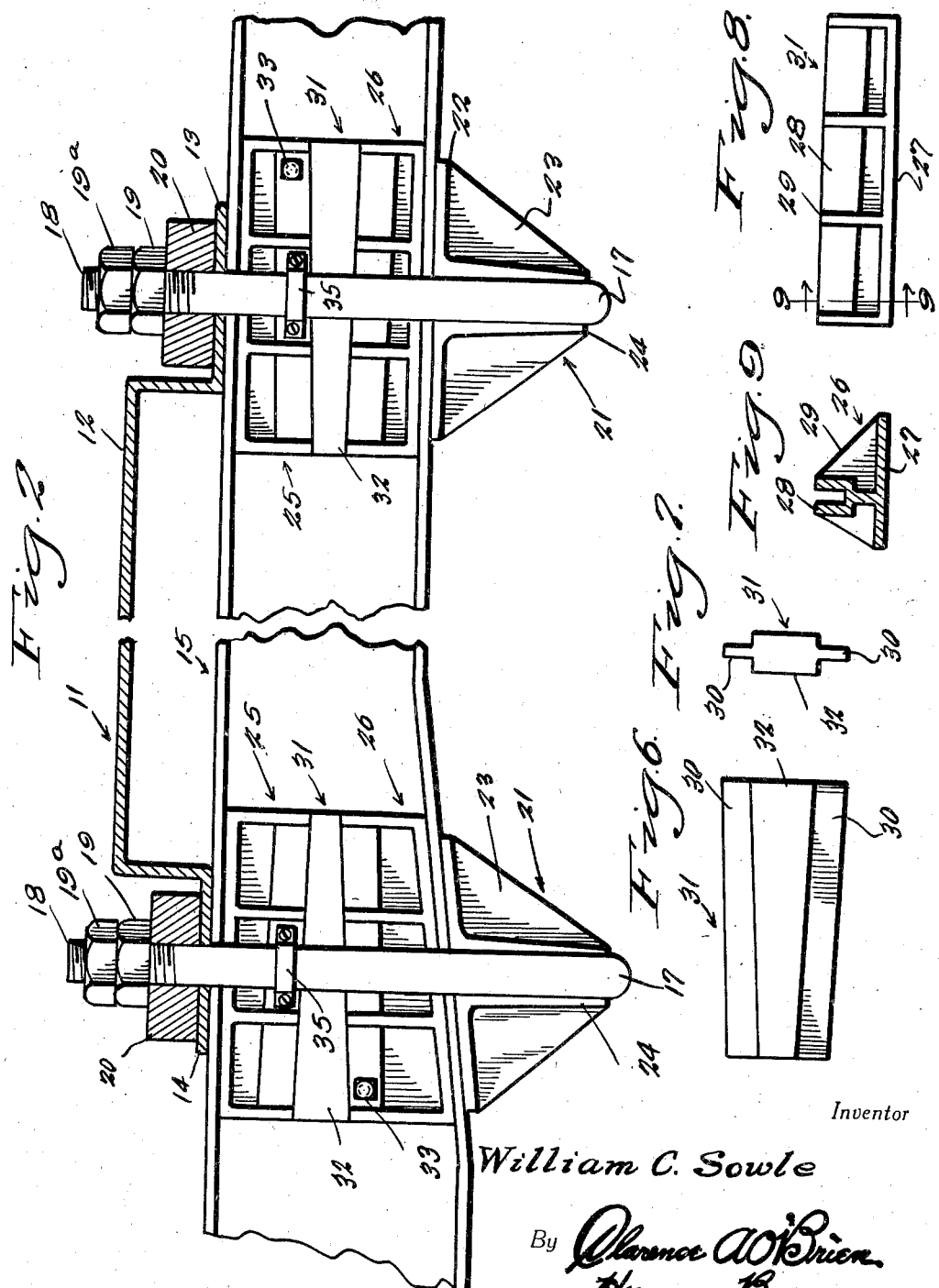

Patented Aug. 16, 1938

2,127,313

UNITED STATES PATENT OFFICE 2,127,313

FIFTH WHEEL MOUNTING FOR VEHICLES

William C. Sowle, Jeffersonville, Ind.

Application July 14, 1937, Serial No. 153,664

5 Claims. (Cl. 280—33.1)

This invention relates to what is believed to be a new and structurally distinct mount and attaching means therefor expressly constructed to accommodate a fifth wheel such as is designed for use, for example, on a tractor semi-trailer combination conveyance.

Needless to say, I am sufficiently conversant with the general state of the field of invention here concerned to adequately appreciate that the art is well developed and characterized by many different styles and types of fifth wheel and equivalent trailer couplings. Manifestly, therefore, my primary aim has to do with the development of a construction which is possessed of appreciable refinements and improvements of a well ordered coordination susceptible of fulfilling the requirements of the trade in a well directed and aptly fitted manner.

One feature of the construction, as will be hereinafter discerned, has to do with the incorporation in the general assembly of special adapted means expressly designed for incorporation in the channel-irons of the chassis in a manner to stabilize the flanges and to thus effectively distribute stress and strain and to avoid possible distortion or collapsing of the channel walls or flanges.

Novelty is also predicated, in a structural sense, on ingenious saddle blocks utilized for coaction with U-bolts constituting hangers or stirrups therefor, said U-bolts providing adequate suspension and retention of the main mounting plate for the fifth wheel unit.

Other collateral, but nevertheless indispensable features will become more readily apparent from the following detailed description, accompanying drawings, and subjoined claims.

In the accompanying drawings, wherein like numerals are employed to designate like details and parts throughout the same:

Figure 1 is a top plan view visualizing the complete device as adjustably and removably secured to the tractor chassis.

Figure 2 is an enlarged fragmentary view, in section and elevation, taken on the plane of the line 2—2 of Figure 1.

Figure 3 is an exaggerated detail section at right angles to Figure 2, the section being on the line 3—3 of Figure 1.

Figures 4 and 5 are side and end elevational views of the U-bolt saddling block.

Figures 6 and 7 are side and end elevational views of the expander and clamping wedge.

Figure 8 is a side elevational view of one of the adapter members in the wedge assembly.

Figure 9 is a section on the line 9—9 of Figure 8 looking in the direction of the arrow.

Referring now to the drawings by distinguishing reference numerals, it will be observed that the fifth wheel, which may be of any appropriate construction, is denoted by the numeral 10, this being supported on the carrier or mounting unit 11. This part 11 may be referred to as a base plate and, in its preferred embodiment, it includes a channel-shaped riser 12 having longitudinal attaching flanges 13 and 14 removably and adjustably bolted to the channel-irons 15 of the chassis structure 16. As before indicated, the flanges are bolted in place through the instrumentality of stirrups or hangers in the nature of U-bolts 17. As illustrated, there are four of these and they are disposed in pairs and clamped at longitudinally spaced points to embrace the channel-irons 15. The threaded ends 18 are provided with retention or clamping nuts 19 and jam nuts 19a. The nuts 19 bear against a thrust plate or cleat 20 properly apertured and resting on the adjacent flange of the base unit 11. This is brought out in Figure 3. Also, shown to advantage here, is one of the U-bolt saddling blocks or members 21. This is disposed transversely across the bottom flange of the channel-irons. As seen in Figure 5, it includes a top or abutment plate 22 having reinforcing webs 23 integrated with the main body portion. This body portion is of segmental form and is cast to provide a keeper groove 24 for the bight portion of the U-bolts 17 (see Figure 3). This provides an adequate means for maintaining the plate or base unit 11 in place.

It has been found expedient and practicable, however, to stabilize the upper and lower flanges of the channel-irons to avoid crushing and distortion. Thus, associated with each saddle block and U-bolt is what may be called a wedge assembly. This is in effect a filler and is located between the parallel flanges.

The assembly just referred to comprises an upper adapter element 25 and a complemental lower adapter element 26. Like the saddle blocks, these parts 25 and 26 are properly shaped to conform to the varying inclinations of the flanges with which they coact. These parts 25 and 26 are substantially duplicate and as brought out in Figures 8 and 9, each part includes a flange contact plate 27 of appropriate width and shape carrying a channel-shaped portion 28 which is in effect a keyway. The numerals 29 merely designate reinforcing webs. The keyways 28 are disposed in opposed relation to accommodate the key forming flanges 30 on the wedge element 31. The body of the wedge is denoted at 32 and is constructed so as to provide the desired spreading force when driven into place between the companion keyways 28. When the wedge is fully lodged in place, it is secured in that position by way of a safety retention bolt 33 of appropriate construction.

To guard against accidental displacement of the wedge assembly, I have found it expedient and practicable to utilize clamping means as indicated at 34 in Figure 3. The clamping means comprises a lug formed integral with the upper key adapter 25, said lug having a detachable clamping band 35 to embrace the adjacent leg or arm of the U-bolt 17. By thus fully assembling the wedges and bolting them in place and then locking the complete assembly by way of the clamp 34, endwise slippage and displacement is carefully avoided.

As will be discerned from the concluding claims, novelty is predicated upon the parts in combination and as component features of the general assembly. That is to say, structural novelty seems to reside, it is believed, in the flanged base unit 11 carrying the fifth wheel 10 disposed transverse with respect to the channel irons 15 and bolted thereto through the instrumentality of the U-bolts 17 and their associated end thrust and stabilizing saddle blocks 21. Then, too, emphasis is directed toward the adoption and use of the wedge assembly constituting the stabilizing means interposed between the flanges of the channel-irons 15 wherein said means is locked, by way of the clamp 34, to the adjacent U-bolts 17.

It is thought that the description taken in connection with the drawings will enable a clear understanding of the invention to be had. Therefore, a more lengthy description is thought unnecessary.

While the preferred embodiment of the invention has been shown and described, it is to be understood that minor changes coming within the field of invention claimed may be resorted to if desired.

I claim:

1. In a structure of the class described, a channel-iron, a plate resting on the top flange thereof, a U-bolt having its threaded limbs joined to said plate, a saddling block interposed between the bight portion of the U-bolt and the lower flange of the channel-iron, stabilizing means interposed between the flanges of said channel-iron, said stabilizing means comprising an adjustable wedge assembly having clamping connection with one of the limbs of the U-bolt.

2. As a component part of an assemblage of the class described, a stabilizing wedge assembly for disposition between flanges of a channel-iron comprising complemental upper and lower adapter elements, said adapter elements having opposed channel-shaped portions constituting keyways, and a wedge interposed between said keyways and having flanges forming keys fitting into said keyways, a lug carried by one of the adapter elements, and clamping means on said lug designed to embrace a complemental U-bolt.

3. In a construction of the class described, in combination, a motor vehicle chassis including opposed parallel channel-irons, a base plate having a channel-shaped central elevated body portion and outstanding marginal attaching flanges, said attaching flanges resting on the top flanges of the channel-irons, and a plurality of clamping devices associated with the end portions of said attaching flanges, each device comprising a U-bolt embracing the adjacent channel-iron, a saddling block interposed between the bight portion of the bolt and the bottom flange of said channel-iron, and stabilizing means interposed between the upper and lower flanges of the channel-iron, the limbs of the U-bolt surrounding the stabilizing means and one of said limbs being attached to said stabilizing means.

4. In a structure of the class described, a channel-iron, a plate resting on the top flange thereof, a U-bolt embracing said channel-iron, a saddling block interposed between the bight portion of the U-bolt and the lower flange of the channel-iron, and an expansible and contractable stabilizing and filler unit lodged between the upper and lower flanges of the channel-iron, whereby to distribute stress and strain and to overcome crushing of the channel-iron upon tightening of the U-bolt.

5. In a structure of the class described, a channel-iron, a plate resting on the top flange thereof, a U-bolt having its threaded limbs attached to said plate, said U-bolt embracing the channel iron, a saddling block interposed between the bight portion of the U-bolt and the lower flange of the channel-iron, and an adjustable sectional filler block lodged between the upper and lower flanges of said channel-iron and connected with said U-bolt to guard against slippage and displacement.

WILLIAM C. SOWLE.